United States Patent
Besuchet et al.

(10) Patent No.: US 8,666,534 B2
(45) Date of Patent: Mar. 4, 2014

(54) METHOD AND APPARATUS FOR A DISPLACEMENT CORRECTION FOR A MACHINE TOOL

(75) Inventors: Jean-Philippe Besuchet, Neuchâtel (CH); Erwin Degen, Biel (CH)

(73) Assignee: Mikron Agie Charmilles AG, Nidau (CH)

( * ) Notice: Subject to any disclaimer, the term of this patent is extended or adjusted under 35 U.S.C. 154(b) by 445 days.

(21) Appl. No.: 12/281,358

(22) PCT Filed: Feb. 27, 2007

(86) PCT No.: PCT/EP2007/001666
§ 371 (c)(1),
(2), (4) Date: Sep. 2, 2008

(87) PCT Pub. No.: WO2007/098917
PCT Pub. Date: Sep. 7, 2007

(65) Prior Publication Data
US 2009/0037017 A1 Feb. 5, 2009

(30) Foreign Application Priority Data
Mar. 2, 2006 (EP) ..................................... 06004202

(51) Int. Cl.
*G06F 19/00* (2011.01)
(52) U.S. Cl.
USPC .............................. 700/195; 700/29; 700/193
(58) Field of Classification Search
USPC .................... 700/193, 29, 57, 58, 73, 74, 195
See application file for complete search history.

(56) References Cited

U.S. PATENT DOCUMENTS

| | | | |
|---|---|---|---|
| 5,779,405 A | 7/1998 | Aiso et al. | |
| 5,809,829 A * | 9/1998 | Seto et al. | 74/89.36 |
| 6,456,896 B1 | 9/2002 | Ito et al. | |
| 6,508,614 B1 * | 1/2003 | Ozaki et al. | 409/231 |
| 6,958,588 B2 | 10/2005 | Engelfried | |
| 6,979,971 B2 * | 12/2005 | Takamune et al. | 318/632 |
| 7,155,826 B2 | 1/2007 | Wehrfritz | |
| 2001/0025534 A1 * | 10/2001 | Gladen | 74/89.36 |
| 2002/0104231 A1 * | 8/2002 | Tominaga et al. | 33/DIG. 4 |
| 2008/0257080 A1 * | 10/2008 | Singh | 74/89.23 |

OTHER PUBLICATIONS

JP 2001138178 Abstract Only.*
JP 2002273642 A Abstract Only.*
JP 2004178534 A Abstract Only.*

* cited by examiner

*Primary Examiner* — Sean Shechtman
(74) *Attorney, Agent, or Firm* — Bachman & LaPointe, P.C.

(57) ABSTRACT

A machine for machining a work piece with at least one revolving or rotating tool, having a ball screw, which is pivoted by a fix and a floating bearing whereas the machine has a device for measuring the length of the extension of the ball screw. Furthermore, a method is provided for measuring and compensation a thermal displacement comprising the steps of: detecting the length U of the axis of the ball screw, detecting the length $I_2$ of the axis of the ball screw, calculating the difference $\Delta l$ of the length $I_1$ extended axis and the reference length $I_2$ of the axis and compensating the difference value to the correct value.

6 Claims, 1 Drawing Sheet

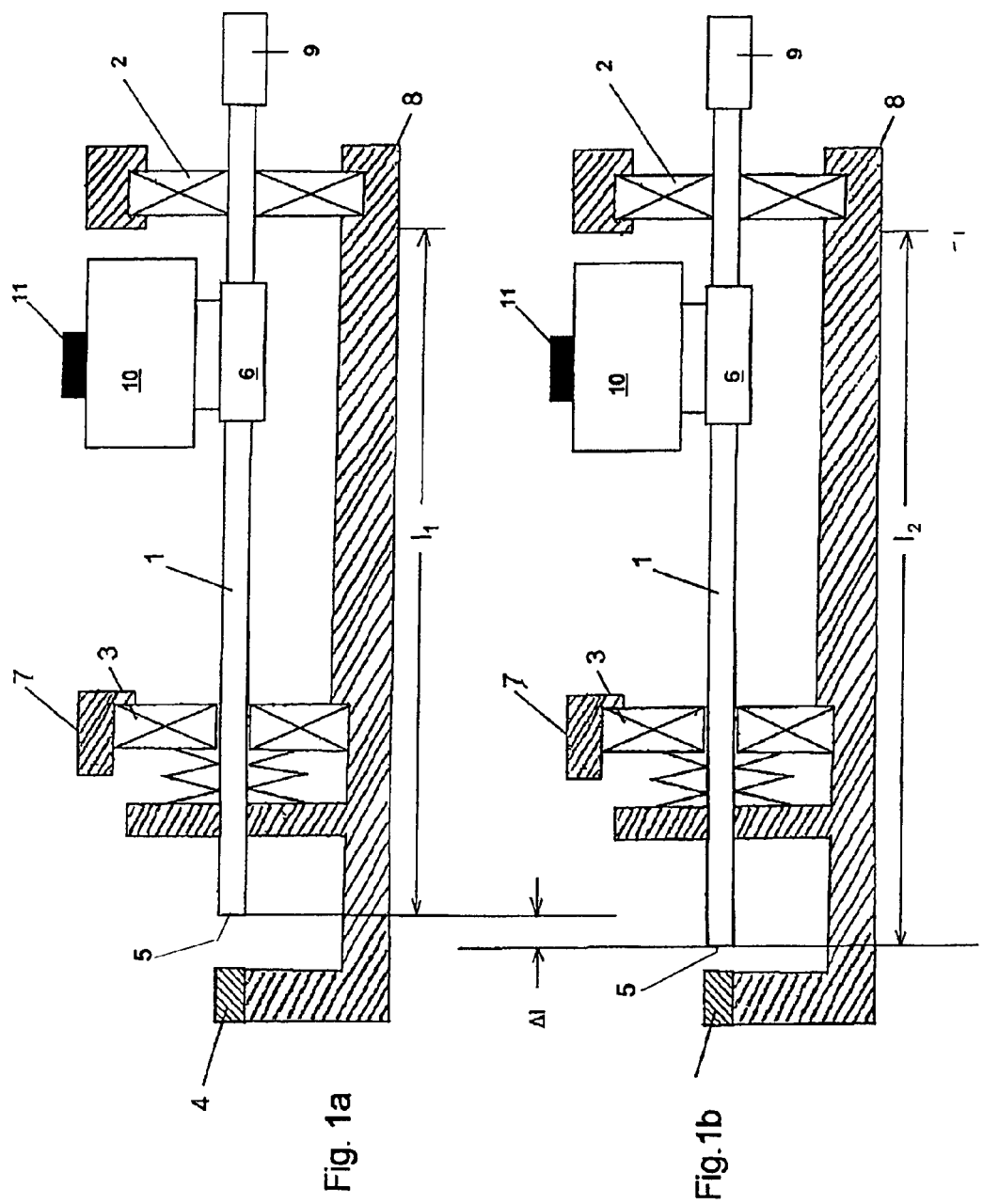

METHOD AND APPARATUS FOR A DISPLACEMENT CORRECTION FOR A MACHINE TOOL

BACKGROUND OF THE INVENTION

The object of the invention is a machine for machining a work piece with at least one tool, having a ball screw, which is supported by a fix and a floating bearing.

For precision machining of work pieces, such as for milling, grinding, EDM machines, lathe etc., it is necessary that a table for workpieces is held over a nut on a ball screw and is positioned with a precision equivalent to the desired precision of the outcome of the work. As a rule, the position of the nut of the ballscrew is supported by one or more positioning devices.

The U.S. Pat. No. 6,958,588 B2 discloses a machine for machining a work piece with at least one revolving or rotating tool has a work spindle with a shaft, whose temperature is monitored by means of at least one temperature sensor. The temperature sensor is detected in contact less fashion. The sensor is preferably a radiation-sensitive sensor, which detects the temperature radiation output. In triggering the positioning drive mechanisms, the control unit of the machine takes into account the temperature expansions of the shaft that result from the temperature changes in the shaft. The positioning drive mechanisms serve to position a tool, carried by the shaft, relative to the work piece. A machining precision is thus achieved that is independent of the temperature and temperature changes of the machine overall, of temperature changes in the coolant lubricant, and of temperature changes in the tool and the shaft, that can all be caused by the power converted at the machining site.

In the U.S. Pat. No. 6,456,896B1 another apparatus and a method for thermal displacement correction for a machine tool is described. The position of a feed shaft is monitored, the mean moving speed and moving frequency of the feed shaft arc measured with every unit time for position correction, and a correction amount is determined from the speed and frequency according to an approximation formula and updated. A position correction amount for a commanded position is determined from this correction amount, and the commanded position is corrected by the position correction amount. The position correction amount for the commanded position is determined from this correction amount, and the commanded position is corrected by this position correction amount. Since the correction amount is determined according to the approximation formula, thermal displacement correction can be effected at all times without requiring any sensor. When the correction amount changes substantially, the thermal displacement is measured by means of a sensor and used as the correction amount, whereby accuracy is improved. The frequency of measurement by means of sensors is reduced, so that the machining time can be reduced.

The object of the invention is to provide a device for compensation thermal caused displacement for generating a better accuracy and an improved better utilization of machining time in a simple way without any complexity.

SUMMARY OF THE INVENTION

The object is achieved by providing a device which has a contact-free device for measuring the length of the extension of the ball screw.

Furthermore the invention is solved by a method for measuring and compensation a thermal displacement comprising the steps of: detecting the actual length of the axis of the ball screw, calculating the difference $\Delta l$ of the length of the extended axis and a reference length of the axis and compensating the difference value to the correct value.

A drift sensor is integrated contact-free at the end of the ball screw to measure its extension in real-time. Based on the delta value reported by this sensor and the actual position of the axis, a compensation value is generated along the axis direction. This value is combined to the target position calculated by the control unit.

This scheme assumes that at the end of the ball screw a floating bearing is used to allow the ball screw to thermally extend away of the fixed bearing.

Furthermore some means are available to initiate a calibration process for the planarity of the measurement surface. Because of the positioning of the sensor and the geometrical tolerances of the ball screw, the sensor typically reports different values based on the orientation of the ball screw.

The planarity issue is compensated for in order to avoid erroneous axes compensation values. This compensation must be active only when the ball screw does not rotate faster than a specified value. On faster speed the natural averaging which occurs on the drift sensors will iron out the unplanarity effect.

The ball screw section is divided by a pre-defined amount of same-sized sectors covering the 360° of the measuring section. To each sector is assigned a compensation value. Based on the circular orientation of the ballscrew, the compensation value for the matching sector is to be used to offset the value returned by the sensor.

The innovative ball screw extension compensation is applicable for any linear axe for example the X, Y and/or Z axes in milling, grinding, EDM machines or lathes etc. Below is the detail formula for calculating the compensation for X. The same formula is applicable for any other axes:

$$X_{comp} = ((X_{curpos} + X_{orgoff})/X_{screwlength}) * X_{screwK} * X_{screwext}$$

where
$X_{comp}$ is the compensation value to be applied on the axis in μm $X_{curpos}$ is the actual machine position on the axis in mm
$X_{orgoff}$ is the distance between the 0-position of the axis and the fix bearing in mm
$X_{screwlength}$ is the length of the ballscrew in mm
$X_{screwK}$ is an extension gain
$X_{screwext}$ is the measured value on the drift monitoring sensor in μm.

BRIEF DESCRIPTION OF THE DRAWINGS

An example of a device according to the invention is shown in the drawings:

FIG. 1a is a device with a reference length of the ball screw and

FIG. 1b is a device with an extended length of the ball screw.

DETAILED DESCRIPTION

The ball screw 1, driven by a motor 9, is connected with a nut 6 as shown in FIG. 1a and FIG. 1b. A table 10 with a workpiece 11 is connected with the nut 6. There are two bearing seats 7,8, each of which holds one bearing device 2,3. The bearing device 3 is for example a roller bearing that supports the ball screw 1 rotatably but axially non-connected. The bearing device 2 is fixed connected with the ball screw 1.

At the end 5 of the ball screw a contact-free sensor 4 is situated. It measures the length of the ball screw 1. For example the sensor could be an inductive, capacitive, optical type etc.

The difference length Δl shows the extension of the ball screw 1 between the reference length l and the extended length $l_2$.

The device described above works as follows:

For measuring the reference position the motor 9, which drives the ball screw 1, has an incremental rotary encoder, which give the base to calculate the linear position of the nut 6. On the other hand the sensor 4 measures contact-free the extension of the ballscrew 1, which is for example elongated by temperature, caused by the long lasting axis motion.

Both results, the position measured by the incremental rotary encoder and the extension of the ball screw 1 measured by the sensor 4, are inputted in a control unit. The control unit calculates the value in a linear method, dependent of the position of the nut.

The extension near the end 5 is larger than the extension near the motor 9.

In a next step the control unit generates a signal to the motor 9 for adjusting the correct position of the nut 6.

The invention claimed is:

1. A machine for machining a work piece comprising at least one tool, having a ball screw, which is supported by a fix bearing for fixedly supporting the ball screw along an axis and a floating bearing on a machine frame, a nut positioned on the ball screw and translatable along the ball screw by rotation of the ball screw, and means for calculating linear position of the nut along the ball screw based on rotation of the ball screw, the machine frame has a contact-free device for continuously measuring an extension of an end of the ball screw along the axis resulting from thermal displacement of the ball screw along the axis without contact between the device and the ball screw.

2. A machine according to claim 1, wherein the contact-free device for measuring the extension is one of an inductive, capacitive or optical sensor.

3. A machine according to claim 1, wherein the fix bearing allows for no axial motion relative to the machine frame and the floating bearing allows for an axial motion relative to the machine frame.

4. A machine according to claim 1, wherein the contact-free device for measuring the extension is arranged opposite an end of the ball screw.

5. A method for measuring and compensation a thermal displacement with a machine, for machining a work piece comprising at least one tool, having a ball screw, which is supported on a machine frame by a fix bearing and a floating bearing, the machine frame has a contact-free device for continuously measuring an extension of the ball screw without contact between the device and the ball screw comprising the steps of:
(1) detecting a calculated position of a nut along the ball screw and an actual length $l_1$ of the ball screw by an incremental rotary device in a motor;
(2) detecting an extended length $l_2$ of the ball screw by the device for continuously measuring the extension without contact between the device and the ball screw;
(3) calculating a difference Δl of the actual length $l_1$ of the ballscrew and the extended length $l_2$ of the ballscrew; and
(4) compensating a difference value to a correct value by the motor.

6. A method according to claim 5, wherein compensation of an extended length of the axis of the ball screw is based on the formula:

$$X_{comp}=((X_{curpos}+X_{orgoff})/X_{screwlength})*X_{screwK}*X_{screwext}$$

where $X_{comp}$ is the compensation value to be applied on the axis in μm $X_{curpos}$ is the actual machine position on the axis in mm $X_{orgoff}$ is the distance between the 0-position of the axis and the fix bearing in mm $X_{screwlength}$ is the length of the ballscrew in mm $X_{screwK}$ is an extension gain $X_{screwext}$ is the measured value on the drift monitoring sensor in μm.

* * * * *